(12) United States Patent
Chou et al.

(10) Patent No.: US 10,861,497 B2
(45) Date of Patent: Dec. 8, 2020

(54) HIGH FRAMERATE VIDEO RECORDING

(71) Applicant: MediaTek Inc., Hsinchu (TW)

(72) Inventors: Kuan-Hung Chou, Hsinchu (TW); Li-Wei Lu, Hsinchu (TW)

(73) Assignee: MediaTek Inc., Hsinchu (TW)

(*) Notice: Subject to any disclaimer, the term of this patent is extended or adjusted under 35 U.S.C. 154(b) by 0 days.

(21) Appl. No.: 16/411,097

(22) Filed: May 13, 2019

(65) Prior Publication Data
US 2019/0348074 A1 Nov. 14, 2019

Related U.S. Application Data

(60) Provisional application No. 62/670,930, filed on May 14, 2018.

(51) Int. Cl.
*G11B 20/10* (2006.01)
*G11B 20/00* (2006.01)
*H04N 5/77* (2006.01)

(52) U.S. Cl.
CPC .. *G11B 20/10527* (2013.01); *G11B 20/00007* (2013.01); *H04N 5/772* (2013.01); *G11B 2020/00072* (2013.01); *G11B 2020/10537* (2013.01)

(58) Field of Classification Search
CPC ........ G11B 20/10527; G11B 20/00007; G11B 2020/00072; G11B 2020/10537; H04N 5/772
See application file for complete search history.

(56) References Cited

U.S. PATENT DOCUMENTS

| 2009/0189995 | A1* | 7/2009 | Shimazaki | H04N 5/772 348/222.1 |
| 2010/0134505 | A1* | 6/2010 | Andersen | G06T 15/005 345/540 |
| 2012/0189263 | A1* | 7/2012 | Kato | H04N 5/783 386/227 |
| 2013/0028570 | A1* | 1/2013 | Suematsu | H04N 5/772 386/224 |
| 2014/0078343 | A1* | 3/2014 | Dai | H04N 5/772 348/231.99 |
| 2018/0343414 | A1* | 11/2018 | Bandwar | H04N 1/2137 |

* cited by examiner

*Primary Examiner* — Thai Q Tran
*Assistant Examiner* — Sunghyoun Park
(74) *Attorney, Agent, or Firm* — Tong J. Lee

(57) ABSTRACT

A device for recording videos includes an image signal processor to process frames captured in response to a request for recording a video at a first frame rate, and a video encoder to encode captured frames. The device also includes processing circuitry operative to allocate image buffers from memory in response to the request, and execute a camera software to direct the image signal processor to fill each image buffer with a batch of the captured frames. For each filled image buffer, a reference of the image buffer is passed from the camera software to a video software at a second rate, which is a fraction of the first frame rate. The processing circuitry then executes the video software to provide one frame at a time to the video encoder for encoding at the first frame rate.

18 Claims, 4 Drawing Sheets

HIGH FRAMERATE VIDEO RECORDING

CROSS-REFERENCE TO RELATED APPLICATIONS

This application claims the benefit of U.S. Provisional Application No. 62/670,930 filed on May 14, 2018, the entirety of which is incorporated by reference herein.

TECHNICAL FIELD

Embodiments of the invention relate to high-speed video recording by a device on which a software framework is deployed.

BACKGROUND

High-speed video recording is gaining popularity in consumer recording devices including smartphones as a feature for entertaining. A video recorded at a high frame rate can be played back in slow motion for analyzing movements and transient phenomena.

A high-speed camera is capable of capturing moving images with high frame rates; e.g., on the order of hundreds of frames per second. The captured images are recorded on a storage medium, which may be a non-volatile storage device such as a flash drive, a Secure Digital (SD) card, or the like. After recording, the captured images can be played back in slow motion. Modern high-speed cameras are electronic devices with image sensors such as charge-coupled devices (CCDs) or complementary metal-oxide-semiconductor (CMOS) active pixel sensors for image capturing and video recording.

For modern mobile devices such as smartphones, the camera and video recording functionalities are typically supported by a software framework deployed on the devices. An example of such a software framework is the Android™ framework. Increasing the frame rates also increases the processing tasks performed by the software framework. This software overhead places an upper limit on the frame rate of the recording device. Therefore, there is a need to reduce the software overhead to improve software efficiency in high-speed video recording.

SUMMARY

In one embodiment, a device is provided for recording videos. The device comprises a memory to store a plurality of image buffers, an image signal processor to process captured frames captured in response to a request for recording a video at a first frame rate, and a video encoder to encode captured frames. The device further comprises processing circuitry which includes one or more processors coupled to the memory and operative to allocate the image buffers from the memory in response to the request, and execute a camera software to direct the image signal processor to fill each image buffer with a batch of the captured frames. For each image buffer filled up with the batch of the captured frames, the processing circuitry is operative to pass a reference of the image buffer at a second rate from the camera software to a video software, where the second rate is a fraction of the first frame rate. The processing circuitry is further operative to execute the video software to provide one frame at a time to the video encoder for encoding at the first frame rate.

In another embodiment, a method is provided for recording videos. The method comprises: receiving a request for video recording at a first frame rate; allocating a plurality of image buffers from memory in response to the request; and filling each image buffer with a batch of captured frames by an image signal processor. For each image buffer filled up with the batch of the captured frames, a reference of the image buffer is passed at a second rate from a camera software to a video software, where the second rate is a fraction of the first frame rate. The method further comprises providing one frame at a time to a video encoder for encoding at the first frame rate.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a device that supports video recording at a high frame rate with low overhead. The device runs software that supports video recording, where the software includes at least camera software and video software. An application may request that a video to be recorded at a first frame rate. After a camera captures image frames of a video at the first frame rate, the camera software passes the image frames in batches to the video software at a second rate, where the second rate is smaller than the first frame rate. The video software then provides the image frames to the video encoder for encoding at the first frame rate. By passing the image frames in batches between the camera software and the video software, software processing overhead is reduced when compared to passing the image frames frame by frame at the first frame rate. The reduced software overhead enables the device to support video recording at an increased (i.e., higher) frame rate. In the following description, an image frame may also be referred to as a frame.

According to embodiments of the invention, frames are stored in image buffers, with each image buffer storing an image batch (i.e., multiple frames). Each image buffer may further include multiple frame buffers, with each frame buffer storing one frame. The image buffers are allocated from a memory in the device. To pass an image batch from camera software to video software, the camera software passes a reference to an image buffer to the video software. An example of a reference is a pointer to a memory location; e.g., a memory address. The video software then provides each frame (more specifically, a reference to a frame buffer storing a frame) to the video encoder for encoding.

Figure 1:
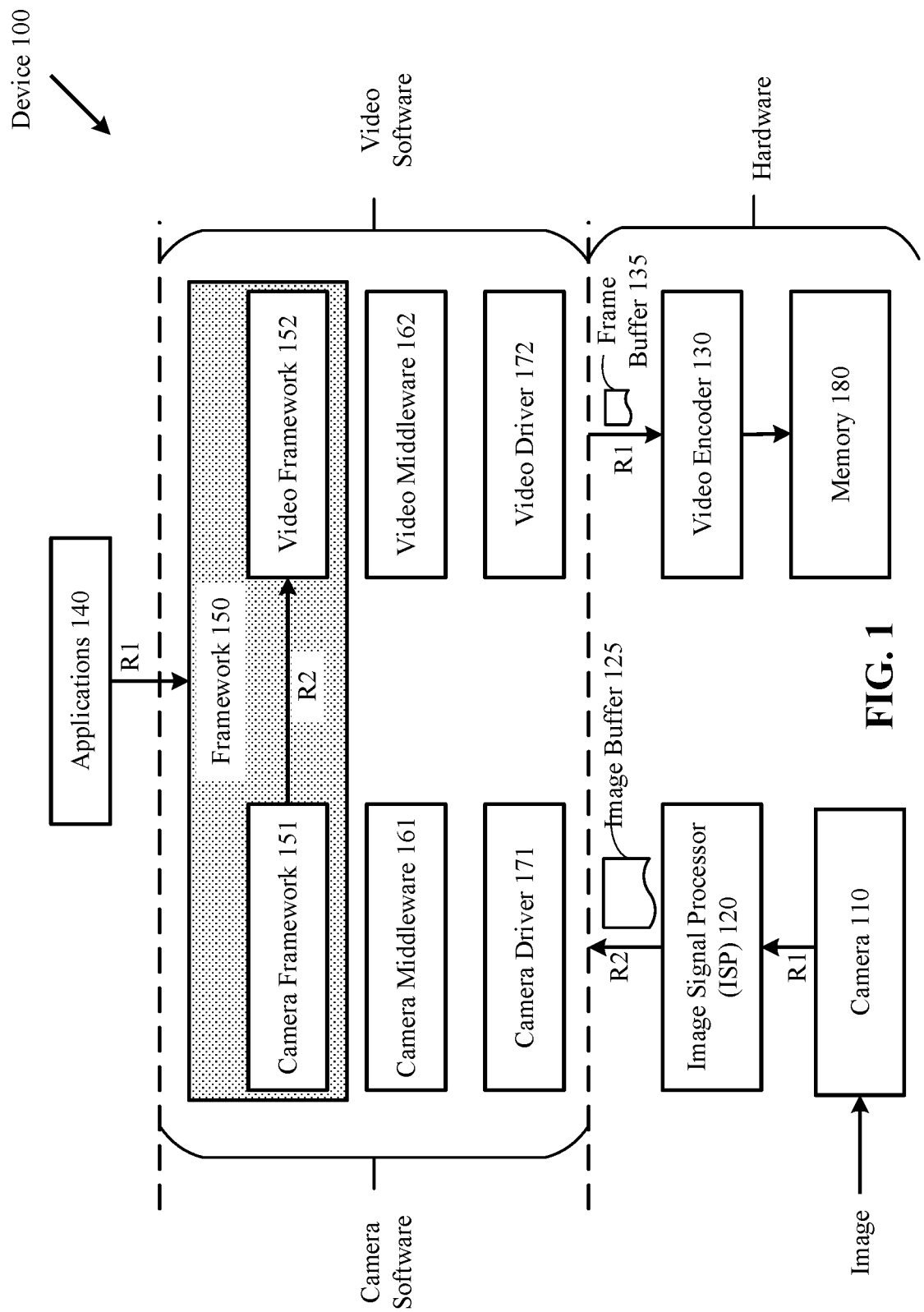
FIG. 1 illustrates an overview of a software and hardware environment in which embodiments of the invention may operate.

FIG. 1 illustrates an overview of a software and hardware environment in which embodiments of the invention may operate. A device 100 includes a number of hardware components, such as image signal processors (e.g., an ISP 120) and media processors (e.g., a video encoder 130), for capturing and processing images and videos. In one embodiment, one or more image sensors (e.g., a camera 110) may be attached to or otherwise communicatively coupled to the device 100. These hardware components may be accessed or utilized by applications 140 via layers of software. A top level of the software is referred to as a software framework or a framework 150, which provides the infrastructure to facilitate application development for the device 100. For video recording, the framework 150 includes a camera framework 151 and a video framework 152, both of which interface between the applications 140 and lower-level software layers. The lower-level software layers control the operations of the underlying hardware components such as the camera 110, the ISP 120 and the video encoder 130.

In one embodiment, the lower-level software layers includes a set of middleware, such as camera middleware 161 and video middleware 162. The camera middleware 161 and the video middleware 162 serves as a bridge between the framework 150 and hardware-specific software, such as a camera driver 171 and a video driver 172, respectively. The camera driver 171 enables the device 100 to communicate with the ISP 120; e.g., with respect to the specification of the images to be captured by the camera 110. The video driver 172 enables the device 100 to communicate with the video encoder 130; e.g., with respect to the encoding format and other requirements.

In this disclosure, the camera framework 151, the camera middleware 161 and the camera driver 171 are collectively referred to as the camera software. The video framework 152, the video middleware 162 and the video driver 172 are collectively referred to as the video software. The camera software and the video software are part of the software that runs on the device 100.

According to embodiments of the invention, an application 140 requests that a video to be recorded at a first frame rate R1 (frames per second (fps)). Accordingly, the camera 110 captures image frames at the first frame rate R1. The ISP 120 fills image buffers 125 at a second rate R2; that is, R2 image buffers are filled per second. R2 is a fraction of R1. More specifically, assume that R1/R2=K, then the ISP 120 fills each image buffer 125 with K frames such that R2 image buffers are filled per second. The camera framework 151 passes a reference of each image buffer 125 to the video framework 152 at the second rate R2. The video software splits the image buffer 125 into K frame buffers 135, and passes a reference of each frame buffer 135 to the video encoder 130 for encoding at the first rate R1. The encoded video may be stored in a memory 180. In one embodiment, the first rate R1 is on the order of hundreds per second. As a non-limiting example, for R1=240 fps and R2=30 per second, the number of frames or frame buffers in an image buffer is 8, i.e., K=8. In one embodiment, the second rate may be a predetermined rate. In one embodiment, the second rate may be a configurable value.

For ease of description, in the embodiment of FIG. 1 the image buffers 125 and the frame buffers 135 are shown as outside the memory 180. It is understood that the image buffers 125 contain the frame buffers 135 and are allocated from a memory such as the memory 180.

Figure 2:
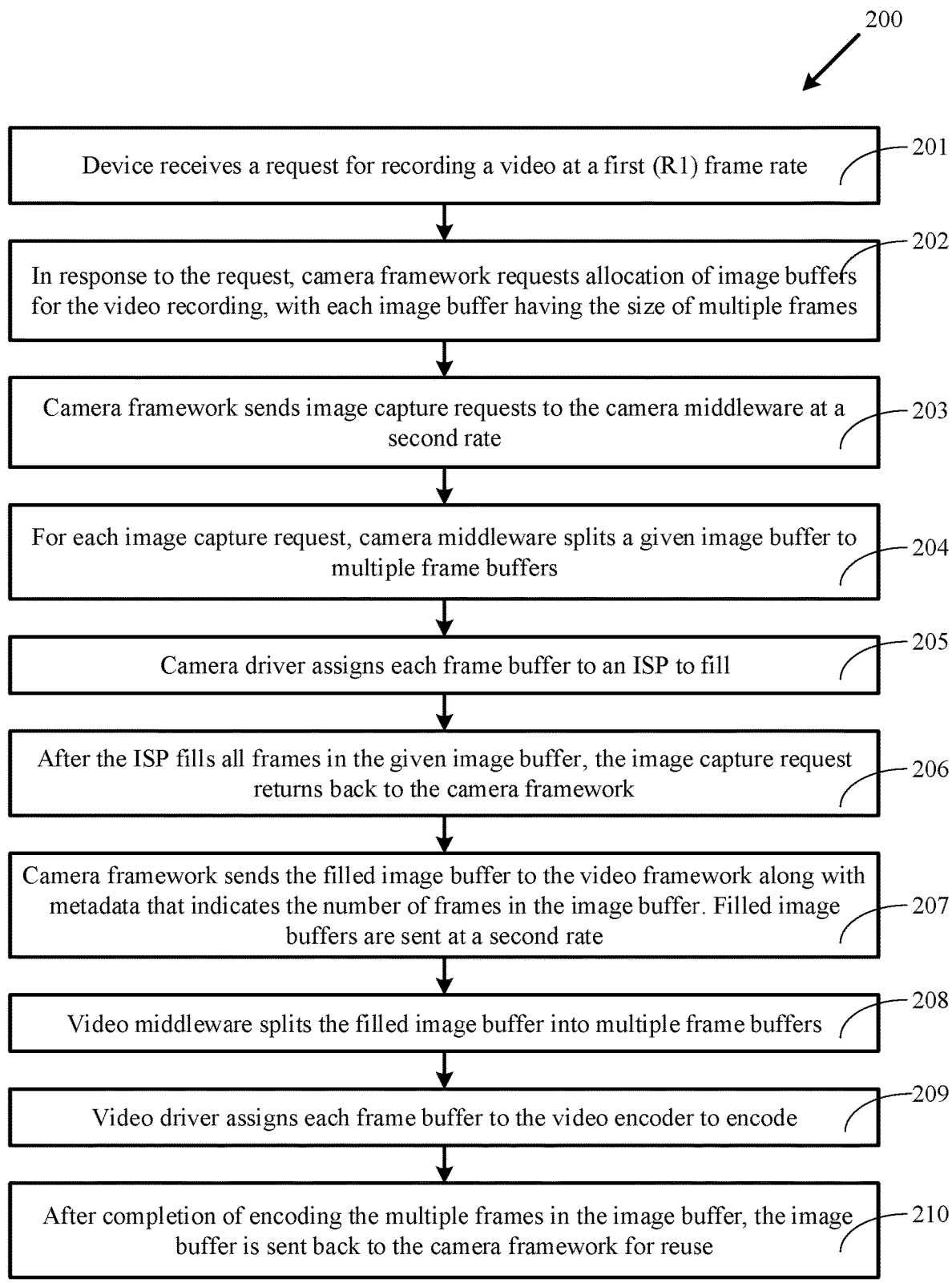
FIG. 2 is a flow diagram illustrating a video recording process according to one embodiment.

FIG. 2 is a flow diagram illustrating a video recording process 200 according to one embodiment. The process 200 may be performed by a device capable of video recording, such as the device 100 of FIG. 1 and/or the mobile device 400 of FIG. 4.

Referring to FIG. 1 and FIG. 2, in one embodiment, the process 200 starts at step 201 when the device 100 receives a request for recording a video at a first (R1) frame rate. In response to the request, the camera framework 151 at step 202 requests the allocation of image buffers from the memory for the video recording. Each image buffer contains multiple frame buffers; e.g., K frame buffers, and each frame buffer is used to store one captured frame. The allocation request may be processed by an underlying operating system which manages the system resources such as memory allocation.

The camera framework 151 at step 203 sends image capture requests to the camera middleware 161 at a second rate (R2), where R1/R2=K. Each image capture request specifies a reference (e.g., a pointer) that points to an image buffer, and metadata which describes characteristics of the images to be captured (e.g., the number of frames per batch, resolution, pixel formats, color adjustment/enhancement). The number of frames per batch is the same as the number of frame buffers per image buffer. For each image capture request, the camera middleware 161 at step 204 splits a given image buffer to multiple frame buffers for the ISP 120 to fill. The camera driver 171 at step 205 assigns each frame buffer to the ISP 120 to fill. After the ISP 120 fills all frames in the given image buffer at step 206, the image capture request returns back to the camera framework 151. At this point, the given image buffer is filled up and the ISP 120 is assigned a next image buffer to fill. The camera framework 151 at step 207 sends the filled image buffer to the video framework 152, along with metadata that indicates at least the number of frames in the image buffer. The filled image buffers are sent from the camera framework 151 to the video framework 152 at a second rate (R2).

The video middleware 162 at step 208 splits the filled image buffer into multiple frame buffers for video encoding. The video driver 172 at step 209 assigns each frame buffer to the video encoder 130 to encode. After the video encoder 130 finishes encoding the K frames in the image buffer, the image buffer is sent back to the camera framework 151 for reuse by the ISP 120.

Figure 3:
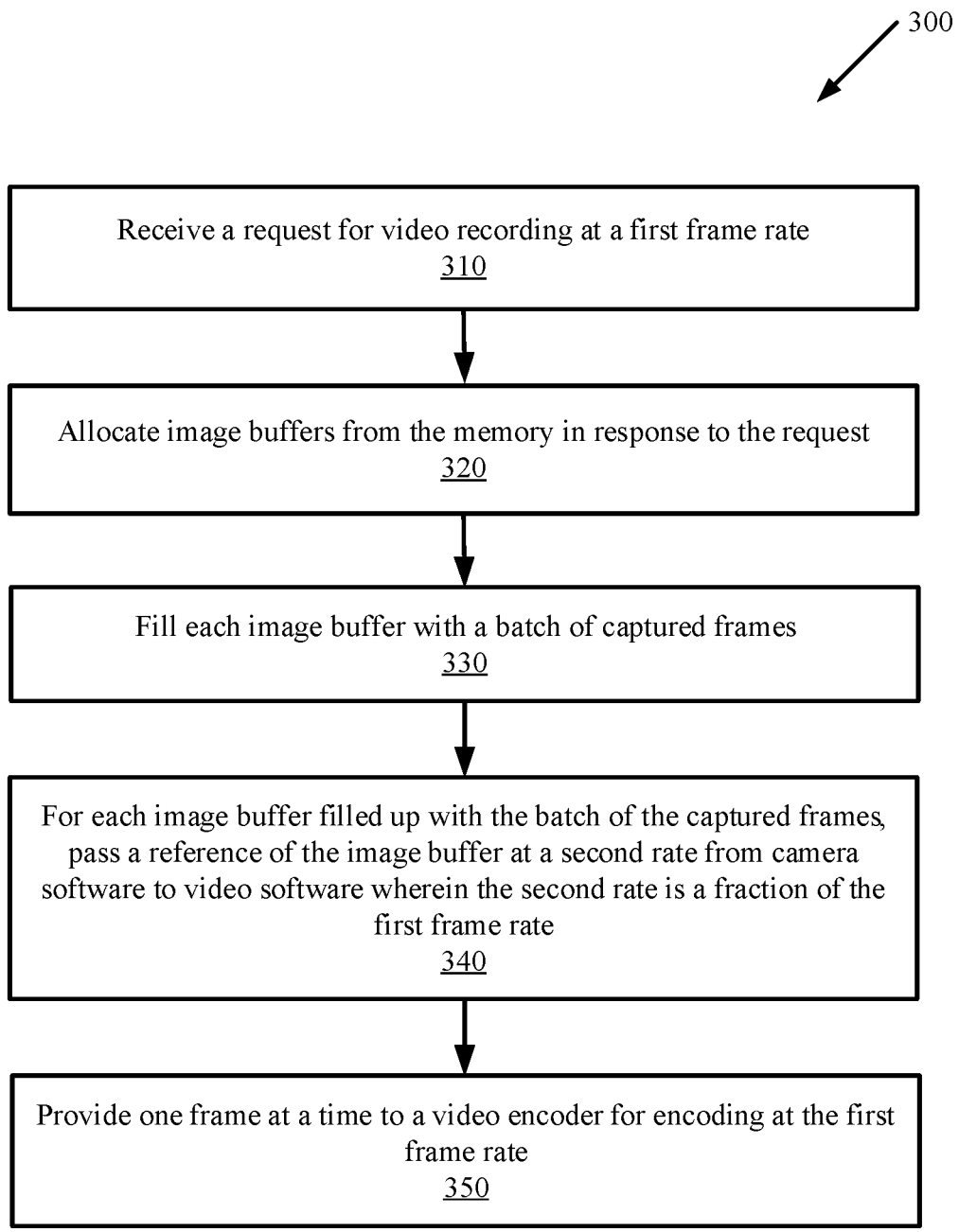
FIG. 3 illustrates a method for video encoding according to one embodiment.

FIG. 3 illustrates a method 300 for video encoding according to one embodiment. The method 300 may be performed by the device 100 of FIG. 1 and/or the mobile device 400 of FIG. 4, or another computing and/or communication device. In one embodiment, the device that performs the method 300 includes circuitry (e.g., processing hardware) and a machine-readable medium (e.g., memory) which stores instructions when executed cause the device to perform the method 300.

Referring to FIG. 1 and FIG. 3, in one embodiment, the method 300 begins at step 310 when the device 100 captures frames in response to a request for video recording at a first frame rate. The device 100 at step 320 allocates image buffers from the memory in response to the request. The device 100 (more specifically, the ISP 120) at step 330 fills each image buffer with a batch of captured frames. At step 340, for each image buffer filled up with the batch of the captured frames, a reference of the image buffer is passed at a second rate from camera software to video software, where the second rate is a fraction of the first frame rate. At step 350, the video software provides one frame at a time to the video encoder 130 for encoding at the first frame rate.

In one embodiment, the device 100 and/or the mobile device 400 may include processing circuitry which executes the camera software and the video software. The processing circuitry may be operative to determine the size of the image buffer according to a ratio of the first frame rate to the second rate. In one embodiment, the size of the image buffer is equal to the first frame rate divided by the second rate. In one embodiment, the size of the image buffer may be determined dynamically after the request for video recording at the first frame rate is received.

Figure 4:
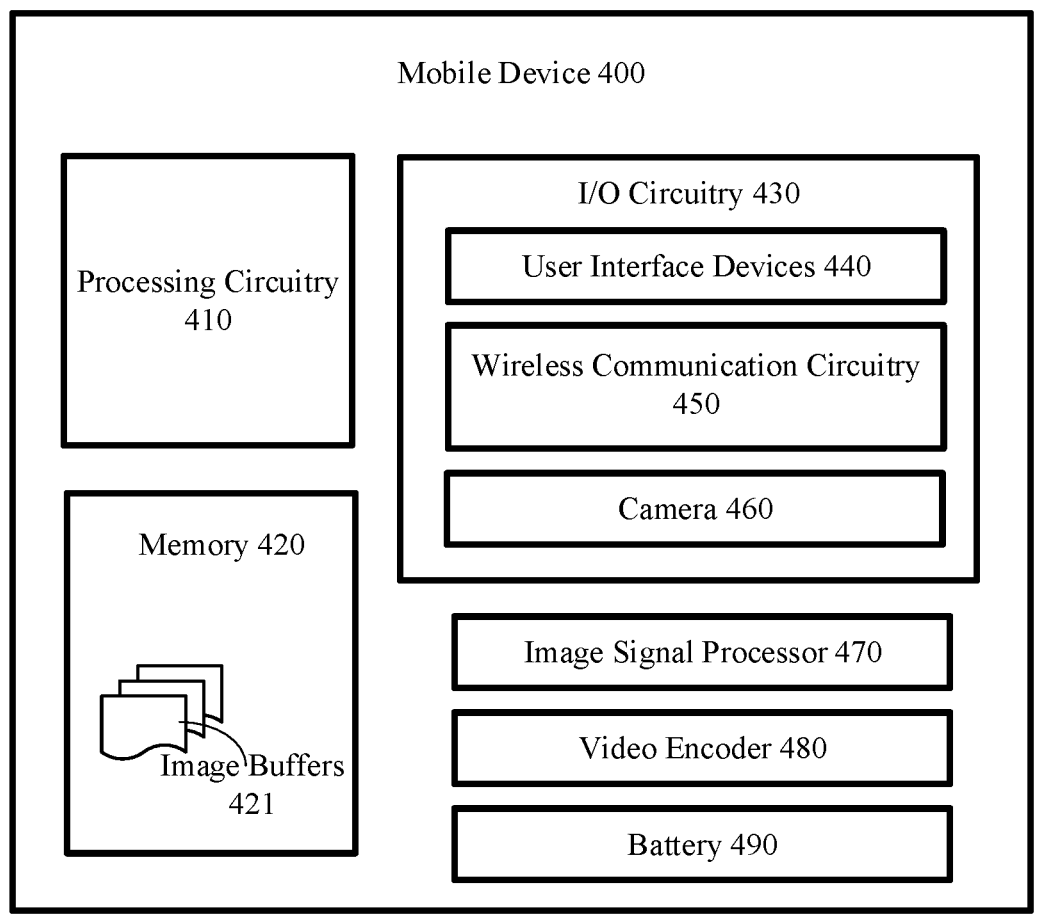
FIG. 4 illustrates an example of a mobile device according to one embodiment.

FIG. 4 illustrates an example of a mobile device 400 according to one embodiment. The mobile device 400 may be an example of the device 100 of FIG. 1, which provides a platform for the aforementioned video recording. The mobile device 400 includes processing circuitry 410, which further includes processors (e.g., central processing units (CPUs), graphics processing units (GPUs), digital processing units (DSPs), multimedia processors, other general-purpose and/or special-purpose processing circuitry). In some systems, the processor may be the same as a "core" or "processor core," while in some other systems a processor may include multiple cores. Each processor may include arithmetic and logic units (ALUs), control circuitry, cache memory, and other hardware circuitry. In one embodiment, the processing circuitry 410 is operative to execute the software (including the aforementioned camera software and the video software) that runs on the mobile device 400. In one embodiment, the mobile device 400 is operative to perform the method 300 of FIG. 3.

The mobile device 400 further includes a memory 420 coupled to the processing circuitry 410. The memory 420 may include memory devices such as a Dynamic Random Access Memory (DRAM) device, a static RAM (SRAM) device, a flash memory device, an SD card and/or other volatile or non-volatile memory devices. The memory 420 may further include storage devices, for example, any type of solid-state or magnetic storage device. In one embodiment, the space in the memory 420 may be allocated as image buffers 421 for storing images captured by a camera 460 and processed by an image signal processor 470.

The mobile device 400 may also include I/O circuitry 430 to receive input and display output. The I/O circuitry 430 includes user interface devices 440 such as a keyboard, a touch pad, a touch screen, a mouse, a display, a microphone and a speaker, etc. The I/O circuitry 430 also includes wireless communication circuitry 450, such as antennas, digital and/or analog radio frequency (RF) transceivers and RF circuitry. The I/O circuitry 430 also includes the camera 460 for capturing images and recording videos.

The mobile device 400 also includes the image signal processor 470 and a video encoder 480 for performing the same operations as the image signal processor 120 and the video encoder 130 of FIG. 1. The mobile device 400 also includes a battery 490 to supply operating power to hardware components of the mobile device 400.

It is understood the embodiment of FIG. 4 is simplified for illustration purposes. Additional hardware components may be included, and some of the components shown in FIG. 4 may be omitted. For example, the mobile device 400 may also include network hardware (e.g., a modem) for connecting to networks (e.g., a personal area network, a local area network, a wide area network, etc.). The network hardware and the wireless communication circuitry 450 enable a user to share a video recorded at a high frame rate (e.g., R1) online; e.g., on social media or other networked forums (e.g., websites on the Internet). In one embodiment, the mobile device 400 may upload a recorded video to a server (e.g., a cloud server).

Although the mobile device 400 is used in this disclosure as an example, it is understood that the methodology described herein is applicable to any computing and/or communication device capable of recording a video. Non-limiting examples of the mobile device 400 include smartphones, smartwatches, tablets, network-connected devices, gaming devices and other portable and/or wearable electronic devices.

The operations of the flow diagrams of FIGS. 2 and 3 have been described with reference to the exemplary embodiments of FIGS. 1 and 4. However, it should be understood that the operations of the flow diagrams of FIGS. 2 and 3 can be performed by embodiments of the invention other than the embodiments of FIGS. 1 and 4, and the embodiments of FIGS. 1 and 4 can perform operations different than those discussed with reference to the flow diagrams. While the flow diagrams of FIGS. 2 and 3 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A device operative to record videos, comprising:
   an image signal processor to process frames captured in response to a request for recording a video at a first frame rate;
   a video encoder to encode captured frames;
   a memory to store a plurality of image buffers, wherein each image buffer contains a plurality of frame buffers and each frame buffer to store one captured frame; and
   processing circuitry including one or more processors coupled to the memory and operative to:
   allocate the image buffers from the memory in response to the request, execute a camera software to direct the image signal processor to fill each image buffer with a batch of the captured frames, for each image buffer filled up with the batch of the captured frames, pass a reference of the image buffer at a second rate from the camera software to a video software, wherein the second rate is a fraction of the first frame rate, and execute the video software to provide one frame at a time to the video encoder for encoding at the first frame rate.

2. The device of claim 1, wherein the processing circuitry is further operative to determine a size of the image buffer according to a ratio of the first frame rate to the second rate.

3. The device of claim 2, wherein the size of the image buffer is equal to the first frame rate divided by the second rate.

4. The device of claim 2, wherein the processing circuitry is further operative to determine the size of the image buffer dynamically after receiving the request for recording the video at the first frame rate.

5. The device of claim 1, wherein the processing circuitry is further operative to execute camera middleware to split each image buffer into the plurality of frame buffers for the image signal processor to fill.

6. The device of claim 1, wherein the processing circuitry is further operative to execute video middleware to split each image buffer filled up by the image signal processor into the plurality of frame buffers for video encoding.

7. The device of claim 1, wherein the processing circuitry is further operative to execute a camera framework and a video framework as part of the camera software and the video software, respectively, and wherein the camera framework passes the reference of the image buffer at the second rate to the video framework.

8. The device of claim 1, wherein the camera software passes metadata to the image signal processor to indicate the number of frames in each batch.

9. The device of claim 1, wherein after the video encoder completes encoding the batch of the captured frames in a given image buffer, the given image buffer is released for reuse by the image signal processor.

10. A method for recording videos, comprising:
receiving a request for video recording at a first frame rate;
allocating a plurality of image buffers from memory in response to the request;
filling each image buffer with a batch of captured frames by an image signal processor, wherein each image buffer contains a plurality of frame buffers and each frame buffer to store one captured frame;
for each image buffer filled up with the batch of the captured frames, passing a reference of the image buffer at a second rate from a camera software to a video software, wherein the second rate is a fraction of the first frame rate, and
providing one frame at a time to a video encoder for encoding at the first frame rate.

11. The method of claim 10, further comprising:
determining a size of the image buffer according to a ratio of the first frame rate to the second rate.

12. The method of claim 11, wherein the size of the image buffer is equal to the first frame rate divided by the second rate.

13. The method of claim 11, further comprising:
determining the size of the image buffer dynamically after receiving the request for recording the video at the first frame rate.

14. The method of claim 10, further comprising:
executing camera middleware to split each image buffer into the plurality of frame buffers for the image signal processor to fill.

15. The method of claim 10, further comprising:
execute video middleware to split each image buffer filled up by the image signal processor into the plurality of frame buffers for video encoding.

16. The method of claim 10, further comprising:
executing a camera framework and a video framework as part of the camera software and the video software, respectively, and wherein the camera framework passes the reference of the image buffer at the second rate to the video framework.

17. The method of claim 10, further comprising:
passing metadata from the camera software to the image signal processor to indicate the number of frames in each batch.

18. The method of claim 10, wherein after the video encoder completes encoding the batch of the captured frames in a given image buffer, releasing the given image buffer for reuse by the image signal processor.

* * * * *